April 15, 1930. O. JOHNSON 1,754,684
WRENCH
Filed March 5, 1927 2 Sheets-Sheet 2
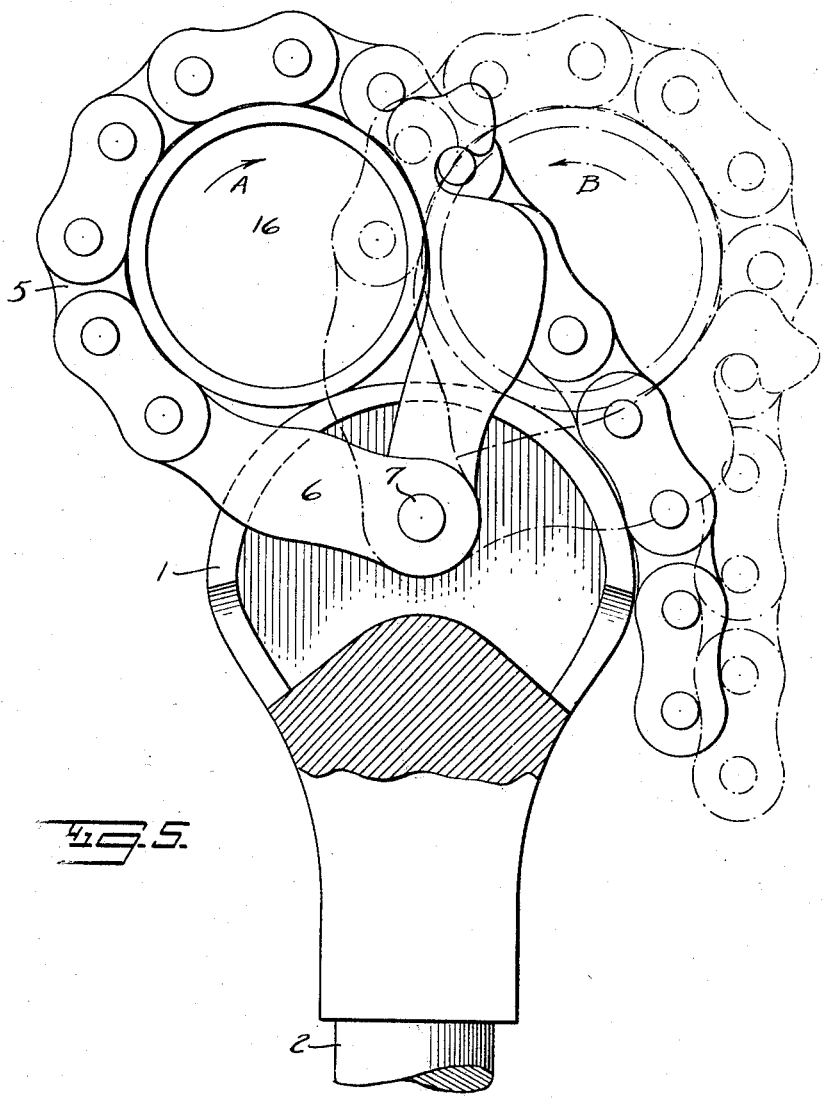
INVENTOR
Oscar Johnson
BY
ATTORNEY Patented Apr. 15, 1930

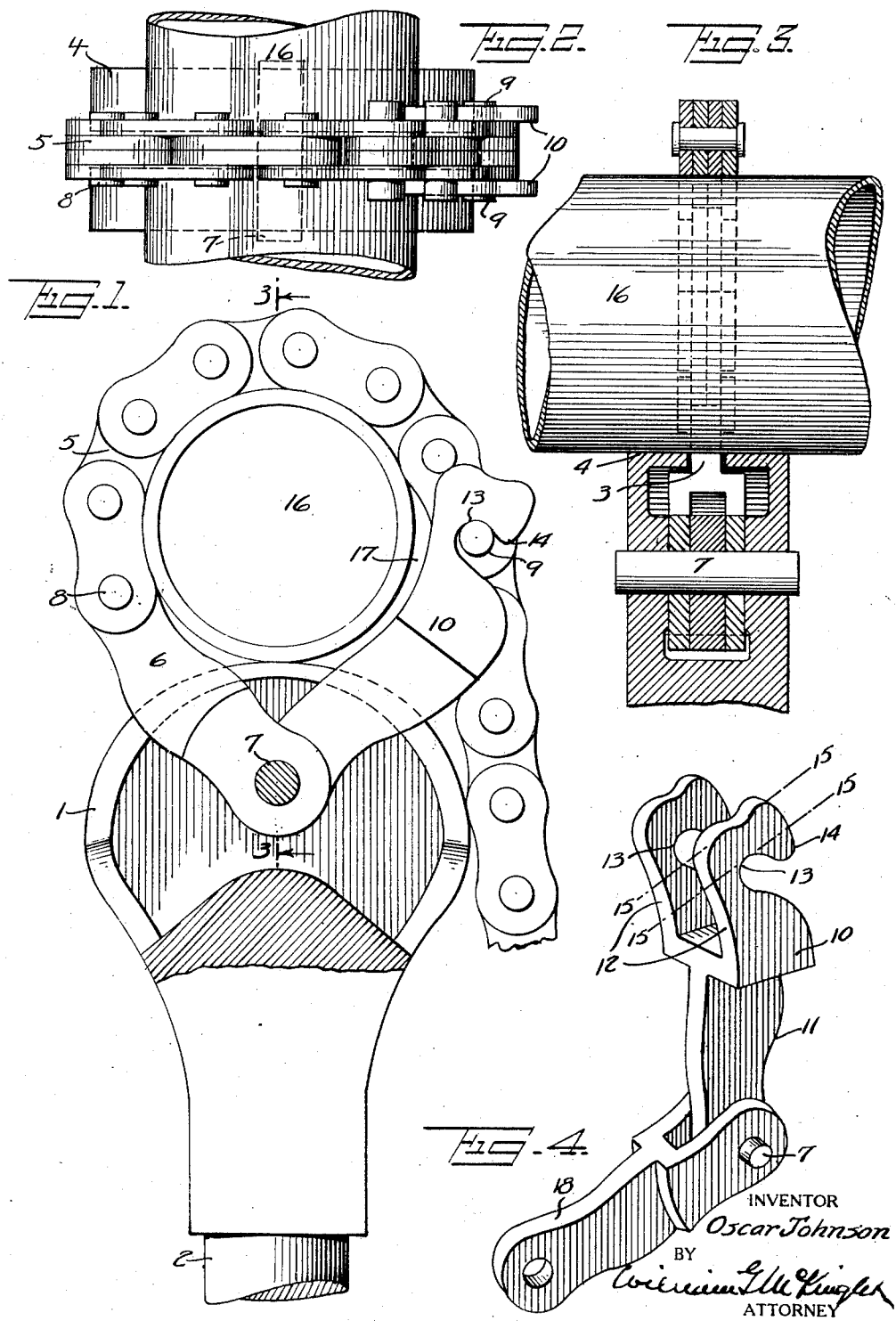

1,754,684

UNITED STATES PATENT OFFICE

OSCAR JOHNSON, OF NEW YORK, N. Y.

WRENCH

Application filed March 5, 1927. Serial No. 173,163.

The invention relates to that type of wrench having a head of generally circular form and provided with a flexible member, such as a chain, to be looped around a pipe, rod or other article, to be turned by the wrench.

It is an object of my invention to provide, in a wrench of that type, a locking member which can be made to engage the chain at different points in its length and positively lock the chain against disengagement when in use to revolve a pipe in either of two directions. Another object is to mount the chain and locking member in the head so that substantially the entire circumference of the pipe, rod or other article to be rotated, will be embraced by the chain. Still another object is to provide an extended bearing surface upon the head for contact with the pipe or article to be rotated.

With the above and other objects in view, reference is had to the following specifications and drawings in which there is described and shown one example or embodiment of the invention, which is not intended as a limitation upon the scope of the appended claims, as it is to be understood that variations and modifications which fall within the scope of the said claims may be resorted to when found expedient.

Fig. 1, is a front elevational view with a part of the head broken away;

Fig. 2, is a plan view of Fig. 1;

Fig. 3, is a section on the line 3—3 of Fig. 1;

Fig. 4, is a perspective view of the master link and the chain locking member, both mounted upon the same pivot;

Fig. 5, is a front view showing the wrench in use to rotate a pipe in either direction.

Referring to the drawings the wrench shown is provided with a head 1 having a generally circular bearing surface, but somewhat flattened at and near its median line. The head is provided with a handle 2, and with a recess 3 forming two bearing surfaces 4 on either side thereof, for contact with a pipe. The chain 5 at one of its ends, is permanently attached to the head by a master link 6 mounted upon the pivot 7 piercing the head. The chain is provided with pins 8 which pins have projections 9 at either side of the chain. Also mounted upon the pivot 7 is a locking member 10 designed for engagement with any one of the pins on the chain so as to produce a loop which will span and embrace pipes of varying diameters.

The locking member (Fig. 4) consists of the shank 11, which may be relatively thin consistent with strength, and at its outer end is formed in two arms 12 separated sufficiently to allow the chain links to rest between them. Each of the arms 12 are provided with curved recesses 13 for engagement with the projections 9 on the chain pins 8, and also with the hooks 14, which, as shown by the dot and dash lines 15—15, project well below the inner bearing surface of the recess 13.

In use (Fig. 1) the free end of the chain is looped around the pipe 16, or other article to be rotated, and placed between the arms 12 of the locking member, which is held close to the pipe, in which position a chain pin is slipped under the hook 14, and the locking member released, when it will move upon its pivot and fall by gravity to the position shown, in which it causes a positive locking engagement with the chain. It will be noted (Fig. 1) that when the member 10 is in engagement with a pin 8 on the chain, there is a slight slack in the chain indicated at 17, which is taken up when the handle 2 is operated to rotate the pipe in either direction.

By reference to Fig. 5 it will be seen that when the wrench is in the position shown in full lines, if the handle is moved to the left the pipe will be rotated in the direction of the arrow A, or clockwise; when in the position shown in dotted lines, if the handle is moved to the right the pipe will be rotated in the direction of the arrow B or counter-clockwise.

When the locking member is in either of the positions shown in Fig. 5 it is impossible to disengage the hook 14 from the pin 9. It is only when the slack is out as shown at 17 in Fig. 1 that the locking member may be disengaged from the pin 9, and to do so, the end of the chain must be held firmly and the member 10 then moved to the left toward the pipe until the hook 14 is raised above the pin 9, and the latter is thus removed from the recess 13. The locking member 10 thus acts as a positive lock for the chain, and can be disengaged only by manual manipulation as described.

Thus is provided a simple and effective means for positively engaging the chain, so that in use the wrench may be manipulated to rotate a pipe in either direction without disengagement from the pipe and readjustment.

The pivot 7, upon which is mounted both the master link and the locking member, is located nearer the bearing surface 4 of the head at the median line thereof, than it is to the bearing surfaces of the head at any points to the right or left of such line. By this expedient there is secured the necessary cam action between head and pipe, whereby rotating force may be applied. By using a master link, the shank 18 of which may be relatively thin, and the locking member, the shank 11 of which is also relatively thin, it is possible to provide a relatively narrow recess 3 in the head, and thus permit relatively wide bearing surfaces 4, without unduly enlarging the head. Also it will be observed (see Fig. 5) that substantially all of the circumference of the pipe 16 is embraced by the chain, all of which is located outside the head, due to the use of a master link and locking member mounted upon the same pivot. Hence the forces exerted upon the walls of the pipe, are exerted substantially equally in all directions toward the center, and this feature in connection with the wide bearing surfaces, tends to substantially eliminate any tendency to crush the pipe when great force is required to rotate it.

From the above it will be apparent that I have devised a wrench, provided with a positive lock permitting use of the wrench to rotate a pipe in either direction without disengagement from the pipe, and to which very great force may be applied without crushing or marring the pipe.

What I claim is:

1. A wrench comprising, a head provided with an operating handle, a master link, a flexible member connected at one end to the master link, a locking member provided at one end with means to positively lock it with the flexible member, both the master link and the locking member being mounted upon the same pivot in the head, and said head having a gradually curved cam surface having points at different radial distances from the pivot.

2. A wrench comprising, a head provided with a recess and gradually curved bearing surfaces on either side of the recess, a master link mounted in said recess, a flexible member provided with projections at each side and connected to the master link, a locking member mounted in said recess and provided with means to engage said projections and positively lock the flexible member, a pivot in the head upon which are mounted both master link and locking member, the pivot being located nearer to one bearing surface of the head than it is to other such bearing surfaces.

3. A wrench comprising, a head, having gradually curved bearing surfaces, a flexible member, a locking member provided at one end with means to engage and positively lock with the flexible member, and being capable of disengagement only by manual manipulation of the locking member, a pivot located in the head, both the flexible member and the locking member being mounted on said pivot and between said surfaces, and said surfaces having central portions nearest the pivot and portions at gradually increasing radial distances from the pivot to each side of said central portions.

4. A wrench comprising, a head provided with a recess and bearing surfaces on each side thereof, a master link pivoted in said recess, a flexible member connected to said link and provided with projections on each side thereof, a locking member pivoted in said recess and provided at its other end with a pair of arms to embrace the flexible member, each of the arms being provided with means to engage the projections on each side of the flexible member and remain in such engagement until the said locking member is manually manipulated to disengage said projections, the said master link and locking member being mounted upon the same pivot.

5. A wrench comprising, a head, having gradually curved bearing surfaces, a flexible member mounted in the head and provided with projections at its sides, a locking member mounted in the head and provided with a pair of arms separated to permit the flexible member to lie between them, each of said arms provided with a recess for engagement with the said projections and a hook, the nose of said hook being lower than that portion of the recess which engages the said projections, whereby the said locking member when in engagement with the said flexible member is incapable of disengagement unless the locking member is moved to raise the said hooks over the said projections, both the flexible member and the locking member being mounted in the head upon the same pivot.

6. A wrench adapted to revolve a pipe, rod or other article in either of two directions without removing the wrench therefrom comprising, a head, having gradually curved bearing surfaces, a master link mounted in the head, a chain secured to the master link, pins projecting on each side of the chain, a locking member, said master link and locking member being mounted upon the same pivot located in the head, the said locking member being provided with hooks to positively engage and remain engaged with the said chain pins when the wrench is in use to revolve a pipe or other article, and which hooks can be disengaged from said pins only upon manual manipulation of said locking member, said bearing surfaces having central portions nearest the pivot and portions at gradually increasing radial distances from the pivot to each side of said central portions.

OSCAR JOHNSON.